US 6,604,753 B1

(12) United States Patent
Boyd (10) Patent No.: US 6,604,753 B1
(45) Date of Patent: Aug. 12, 2003

(54) REAR WHEEL STEERING PROCESS

(76) Inventor: Joseph J. Boyd, 103 Timberlane Rd., Cumming, GA (US) 30040

( * ) Notice: Subject to any disclaimer, the term of this patent is extended or adjusted under 35 U.S.C. 154(b) by 0 days.

(21) Appl. No.: 10/225,787

(22) Filed: Aug. 22, 2002

(51) Int. Cl.$^7$ .............................................. B62D 53/06
(52) U.S. Cl. ................... 280/426; 280/414.5; 280/442; 280/137.5
(58) Field of Search ............................. 280/414.5, 426, 280/442, 445, 81.6, 99, 87.2, 100, 91.1, 137.5; 180/408, 411, 236, 237, 238, 449

(56) References Cited

U.S. PATENT DOCUMENTS

| | | | | |
|---|---|---|---|---|
| 4,848,783 A | * | 7/1989 | Christenson | 280/405.1 |
| 5,035,439 A | * | 7/1991 | Petrillo | 280/426 |
| 5,213,353 A | * | 5/1993 | Williams | 280/426 |
| 5,479,999 A | * | 1/1996 | Proia | 280/426 |
| 6,152,475 A | * | 11/2000 | Poole | 280/426 |
| 6,409,199 B1 | * | 6/2002 | Boyd | 280/426 |
| 6,431,564 B1 | * | 8/2002 | Proia | 280/405 |

* cited by examiner

Primary Examiner—Daniel G. DePumpo
(74) Attorney, Agent, or Firm—Troutman Sanders LLP; Ryan A. Schneider, Esq.

(57) ABSTRACT

A method and apparatus for long vehicles to make sharp turns on city streets without running up on the curb. The back wheels of the vehicle are steered with the aid of a guide control wheel so that when the semi or truck is making a sharp turn, the rear wheels continue straight down the street to the intersection and then turn, even though the semi and the front of the trailer have already turned in a normal manner.

12 Claims, 9 Drawing Sheets

REAR WHEEL STEERING PROCESS

BACKGROUND OF THE INVENTION

1. Field of the Invention

The present invention generally relates to a steering process which allows long vehicles to make sharp turns. More specifically, the present invention pertains to a rear wheel steering process for long vehicles, including among others, trucks, busses, stretch limos, and semi-tractors and trailers, enabling their vehicles to safely and easily clear the curb when making sharp turns on narrow city streets.

2. Description of the Related Art

Presently, long vehicle turns in tight situations can be quite dangerous. For example, when turning from one city street to another, the driver of a large trailer rig must begin the turn in the second lane over from the curb, thus taking up both lanes of traffic, in an effort to prevent the rear tandem wheels of the rig from running over the curb and perhaps up on the sidewalk. Similarly, long vehicle turns across four lane intersections can be dangerous. If the trailer is crossing a four lane road, it may take two lanes into the intersection, and take two lanes as it turns.

If the semi is pulling two trailers, the above problem is compounded. In such a situation, the semi turns into the intersection, the first trailer cuts across the curb, and the second trailer crosses on the sidewalk. Long trucks, busses and stretch limos, like the trailers, also must take more than their share of the road when turning sharp corners.

There have been several attempts to overcome the above disadvantages. Some long ladder fire trucks and ladder trailers have a seat and steering wheel over the rear wheels, and a fireman steers the back wheels so as to miss the curb. Steering the back wheels of a vehicle is old art. An early automobile had both front and back wheels that were steerable. Yet, directly steering the rear wheels of a vehicle has its share of problems as well, including the need of an additional driver, just to name one.

It would be beneficial to provide a rear wheel steering system that a single driver can operate by the push of a button. Such a system would improve truck hauling safety. In view of the prior art it can be seen that there is a need for a modified rear wheel steering system for long vehicles. It is to the provision of such a system that the present invention is primarily directed.

BRIEF SUMMARY OF THE INVENTION

The present invention is a rear wheel steering process that enables a long vehicle to make tighter turns than are possible with conventional steering assemblies. The present rear wheel steering system requires only minimal intervention by the driver, and allows the trailer-rig, truck or bus to make sharp turns without crossing into the other lane, yet providing for the rear wheels to miss the curb.

The present rear wheel steering process comprises a control system and a rear wheel guidance system. The control system is capable of automating the steering process of the rear wheels, while the rear wheel guidance system is capable of defining the path for the rear wheels to follow. Preferably, the rear wheel guidance system comprises a guide control wheel that lowers to the travel surface in response to the control system. The rear wheel guidance system can further comprise a gyrocompass assembly housed on a pivotal rear wheel unit.

The description of the present invention will include specific references to a tractor-trailer vehicle type, but it will be understood that the steering system is useful in all manner of vehicle types that incorporate rear wheel assemblies.

Further, the term "centerline" will be used in references with the vehicle and the wheels of the vehicle, and will be understood to mean as described below. The term "vehicle lengthwise centerline" will refer to the centerline of the vehicle in its direction of travel. For example, when describing a semi, the tractor-trailer lengthwise centerline will be the centerline running between the front and back ends, from the cab to the end of the trailer.

Similarly, the centerline of a particular wheel of the vehicle will refer to the centerline of the wheel in its direction of travel. Thus, for example, in a "normal driving state", wherein the semi is traveling general straight down the road, the tractor-trailer lengthwise centerline, and all the centerlines of the wheels, would be in generally parallel orientations. It will be understood that if a particular wheel of the vehicle is pivotally enabled on the vehicle, the centerlines of the vehicle and wheel may not always be generally parallel. For example, in a turn (or "turning state"), the centerline of the vehicle may rotate out of alignment from the centerline of the pivotal wheel. If the rear wheel(s) of a vehicle were pivotal, and the front wheel(s) of the vehicle were to initiate a turn of the vehicle, while the centerline of the vehicle rotated along the radius of the turn, the rear wheel, free to pivot, might continue to travel in the direction of the vehicle before the turn, because of surface friction, before the rear wheel would rotate into the turn.

Likewise, the "rear wheel unit centerline" may, or may not, lie on the lengthwise centerline of the cab. During normal hauling, the centerlines would lie on atop the other. But when the rear wheel unit pivots relative to the length of the trailer, the rear wheel unit lengthwise centerline will similarly angle away from the trailer's lengthwise centerline.

The present steering system has a "normal driving state" and a "turning state". In the normal driving state, the rear wheels are locked in alignment with the vehicle's centerline, like any standard trailer. The normal driving state is the typical highway hauling use of the vehicle. As the long vehicle approaches a sharp turn, the driver of the vehicle activates the control system of the rear wheel steering system from the normal driving state to the turning state, wherein the rear wheels are then steerable.

Preferably, the invention is a process of rear wheel steering for a vehicle traveling on a driving surface comprising the steps of resisting the rear wheels from pivoting during the normal driving state so the centerline of the rear wheel remains generally parallel to the centerline of the front wheel. In this way, during highway driving, for example, the rear wheels of the semi can be locked from free pivot. Upon initiation of a turn, the invention maintains the rear wheels in a straight line of travel, although the vehicle has begun to turn on its front wheels. This step of the invention comprises guiding the pivoting of the rear wheel upon entrance of the turning state, and preferably includes the lowering of a guide control wheel. At a preset condition, the rear wheels are then freed from guidance prior to exit of the turning state, so the rear wheels may now pivot, and the vehicle complete the turn.

The control system of the present invention determines when to initiate the step of guiding the pivoting of the rear wheel, and preferably when to initiate the step of freeing the rear wheel from guidance.

The rear wheel(s) of the vehicle may be located on a rear wheel unit. The pivotal rear wheel unit enables the rear wheels to turn through a turning angle about the lengthwise centerline of the vehicle. In city driving applications, the wheels may be powered by fluid cylinders, electric motors or other standard means.

While the vehicle is on the straight highway, the system is in the normal driving state, and the present system is deactivated. The driver can then activate the system via the control system when entering a turn. Upon activation of the present system, the rear wheel guidance system will lower a guide control wheel to safely keep the rear wheels in alignment as the trailer makes its turn down the side street.

If the tandem rear wheel unit is free to pivot on the trailer, it will guide itself straight down the road, without any other means of guidance. However, one cannot safely steer the wheels in this manner. The reason is that if one set of the tandem's wheels are on dry pavement and the other set is on a wet road or ice and the brakes lock, the wheel unit will always turn crosswise of the road and wreck the trailer. The same thing happens if the brake adjustment on one side is different to that on the other side and the brakes lock on one side. If the rear tandem wheels are free to pivot, they can easily be turned by potholes, blowouts, trash or a minor accident.

The guide control wheel offers the required resistance to pivoting because in order for the rear wheels to pivot, the control wheel would need to slide sideways (perpendicular to wheel travel) on the pavement, and a lever arm between the guide wheel and the pivoted rear wheel unit is long. This resistance to sliding on dry pavement is what keeps rubber tire vehicles moving in the direction the wheels are pointing, and allows precise control of the modern rubber-tired automobiles and trucks on our high speed highways.

Another means of rear wheel guidance uses a gyrocompass which is mounted on the rear wheel unit, and when the rear wheel unit is unlocked from the conventional highway hauling non-pivotable position, the gyroscope is energized, and by means of its controls, keeps the rear wheels rolling straight down the road as the semi turns.

The gyrocompass assembly is a two degree of freedom stable platform having a gyroscope (or "gyro") supported in gimbal rings. The gyroscope is rotatable about a vertical axis. The centerline of the gyro is normally maintained in alignment with the trailer's lengthwise centerline by biasing elements of the gyrocompass assembly, but once energized, the gyro can resist turning with a force greater than that of the biasing elements. The biasing elements can be springs.

When the semi begins to turn, the trailer also begins to turn, and the rear wheels of the trailer are subjected to a turning force. Yet, the gyro still points as it did when it started (aligned in the lengthwise centerline of the vehicle), so when the trailer turns the trailer frame presses against a gyro frame of the gyrocompass assembly. Upon such contact, a switch to a solenoid valve closes, which operates a turning mechanism that keeps the wheel centerline parallel to the gyroscope centerline.

The turning mechanism can comprise at least one cylinder. For example, when the switch is activated, one of two hydraulic cylinders begins to extend. As the cylinder is attached at one end to the trailer and the other end to the rear wheel unit, when the cylinder begins to extend, it pushes (or pulls) the unit about the pivot, to relieve the contact between the trailer frame and the gyro frame. This maintains the rear tandem wheels in alignment now with the gyro's centerline, as opposed to the trailer's centerline.

When the semi enters the intersection and turns down the cross street, the front of the trailer turns at an angle to the semi. However, the rear wheels of the trailer do not turn with the trailer but roll straight down the road guided by the guide control wheel. As the semi continues down the cross street, the turning angle between the lengthwise centerline of the trailer and the centerline of the rear wheels becomes increasing larger, until a preset turning angle is reached, opening a switch of the control system. The rear wheels are then brought back into alignment with the trailer's centerline with aid of the gyrocompass assembly.

The rear wheels of very long trailers are provided with a turning angle of approximately 45 degrees. This means that about one-half of the trailer has moved into the cross street before the rear of the trailer starts to turn. The wheels thus easily miss the curb, but the body of the trailer might overlap, unless the curb is rounded off.

The turning angle that the wheels can pivot on long, self powered equipment like trucks, busses, and automobiles might be limited by the drive shaft angle, but the turn can be shortened by having a maximum turning angle of approximately 30 degrees. The turn of the rear wheels does not start until the maximum turning angle is reached, and then they would need to turn only (90−30=60) degrees more. A standard front wheel drive set of wheels would allow a greater angle and still take a standard drive shaft.

When the trailer or truck is fully in the cross street and the wheels have realigned with the vehicle's centerline, they are locked in position for highway hauling.

The control system can be adjusted to allow the driver some control over the angle the wheels can turn and the time to return. For example, the rear trailer wheels can be guided straight ahead to the intersection by the guide control wheel. The rear wheels of the trailer continue to roll straight towards the intersection. When the trailer has turned through an angle to the rear wheels of, for example, 45 degrees, it hits a stop on the tandem wheel unit and can not further turn. The trailer's wheels remain at this angle, so that the rear of the trailer moves the rest of the way into the intersection at the angle of the wheels. As the rig comes into alignment, the driver switches the controls back to the normal driving position.

For normal sized trailers, trucks, busses and the like, the rear wheels may be returned to the centerline automatically. But for very long vehicles, or two trailers in line, it would be best to let the trailer continue into the intersection at the maximum turning angle of the wheels.

Before the steering system of the present invention, there were few very long trucks, busses or fire engines, but once it is known that such vehicles can make sharp turns if they have the present rear wheel steering system, they may become more widespread.

DETAILED DESCRIPTION OF THE PREFERRED EMBODIMENTS

Figures 1, 2:
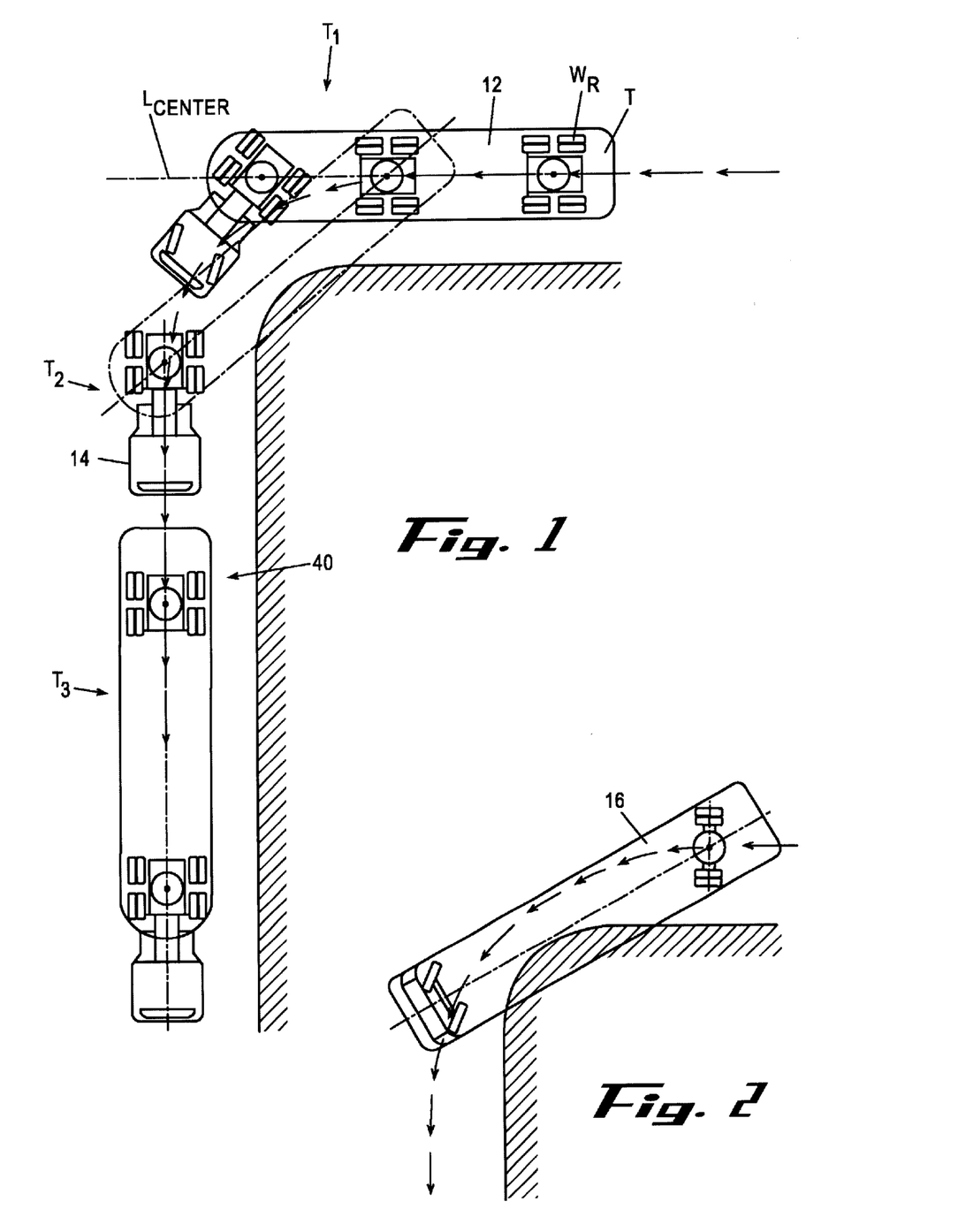
FIG. 1 is a cutaway plan view of three different "snapshots" of a semi and trailer turning on a city street, wherein the turning angle is approximately 45 degrees.
FIG. 2 is a cutaway plan view of a long bus rolling into the intersection, wherein the turning angle is approximately 45 degrees.

Several of the advantages of the present invention are illustrated in FIGS. 1 and 2. FIG. 1 shows truck T in various stages of turning through locations $T_1$, $T_2$ and $T_3$. At location $T_1$, the trailer 12 of the truck T has just reached the intersection, wherein the rear wheels $W_R$ are in line with the lengthwise centerline $L_{CENTER}$ of the trailer 12. The semi is beginning the turn at $T_1$.

At location $T_2$, the rear wheels $W_R$ of trailer 12 have reached the total turning angle, in this case 45 degrees. The semi 14 has completed the turn and is moving straight down the street. The rear wheels of the trailer easily make the remainder of the turn without coming close to the curb. At location $T_3$, the semi 14 and the trailer 12 are shown with the wheels $W_R$ realigned with the trailer centerline.

FIG. 2 shows a bus or truck 16 with the wheels at about 30 degrees with the vehicle centerline. The line of arrows illustrates the coarse of the rear wheels. The body of the bus overhangs the curb, but the wheels miss the curb.

In comparing FIG. 1 and FIG. 2, one can see how increasing the wheel angle from 30 degrees to 45 degrees greatly increases the ease of making the turns. At 45 degrees, very long vehicles can easily make sharp turns in narrow city streets. In order to provide long vehicles with the turning capabilities as described above, a novel rear wheel steering system was developed and became the basis of the present invention.

The present invention is a method and apparatus to restrain the pivotal rear wheel unit from turning with the trailer at an intersection until a preset angle is reached. The angle of interest is defined as the angle between the centerline of the rear wheel unit and the lengthwise centerline of the vehicle. This angle is determined by monitoring a gyrocompass (which indicates the lengthwise centerline of the vehicle before the turn) and the centerline of the vehicle (ever changing orientation through the turn).

For example, assume a tractor-trailer is traveling straight down the road. Arbitrarily, the centerline of the trailer is at 0 degrees, as is the rear wheel unit. When the trailer begins to turn onto a perpendicular road, the trailer centerline will rotate from 0 to 90 degrees. Ordinarily, somewhere in the turn, the rear wheel unit is subjected to a turning force to follow the trailer. The present invention resists this turning force on the rear wheel by using a guide control wheel unit until a preset angle is encountered, the angle being the angle between the trailer centerline as it changes through the turn, and the original 0 degree position. The original 0 degree orientation is maintained through the turn by the guide control wheel. Only when the present angle is reached, does the present invention turn the rear wheel unit back into alignment with the trailer centerline, which will be the 90 degrees upon completion of the turn. Thus, the present invention forces the rear wheel unit to maintain the 0 degree position longer than it would without the present invention, and then turns the rear wheel unit into the turn.

The present rear wheel steering process comprises a control system 100 and a rear wheel guidance system 150. The control system 100 is capable of automating the steering process of the rear wheels, while the rear wheel guidance system 150 is capable of defining the path for the rear wheels to follow. The rear wheel guidance system 150 can comprise a gyrocompass assembly 30, or alternatively a guide control wheel 152 that lowers to the travel surface in response to the control system 100.

The rear wheel steering system of the present invention can comprise a gyrocompass assembly 30 housed on a pivotal rear wheel unit 40, and a control system 100. The gyrocompass control system of the present invention comprises the gyroscope 30 a pivotable rear wheel unit 40, and a turning mechanism 50. The pivotable rear wheel unit 40 illustrated in FIGS. 3–5 includes four sets of tandem rear wheels $W_R$. The unit 40 is pivotably attached to the trailer 12 via pivot 42.

Figure 3:
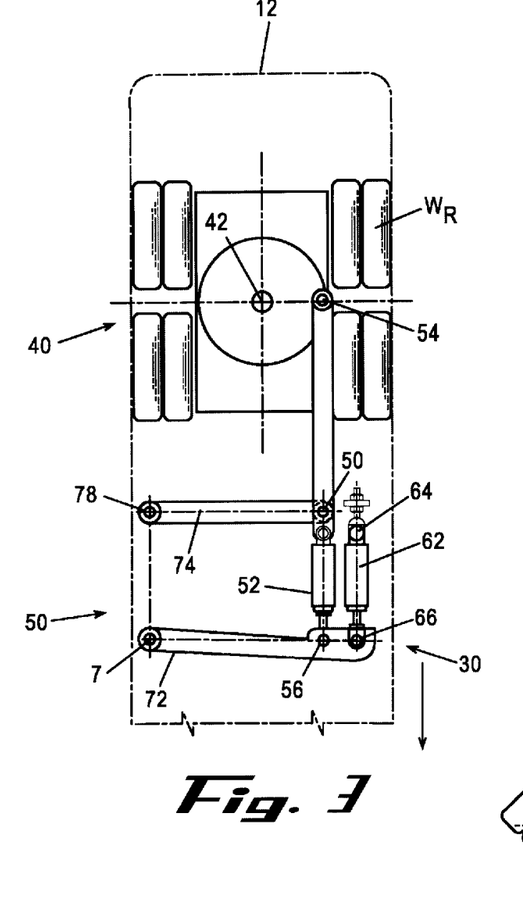
FIG. 3 is a cutaway plan view of the pivotal rear wheel unit of the present invention and the turning mechanism of the gyrocompass assembly shown as hydraulic control cylinders.

The turning mechanism 50 is capable of pivoting the rear wheel unit 40 about pivot 42. Preferably, the turning mechanism 50 comprises at least one extension member 52 having a unit end 54 attached to the rear wheel unit 40, and an extension end 56. As shown in FIG. 3, the turning mechanism can further comprise a second extension member 62 having a fixed end 64 attached to the trailer 12, and an extension end 66. The turning mechanism 50 can further two pivot arms 72, 74 rotatable about points 76, 78, respectively. Ends 56, 66 of the extension members 52, 62, respectively, are pivotable with pivot arm 72. Extension member 52 is also pivotable with pivot arm 74 between the ends 54, 56 of extension member 52, illustrated as point 58.

Figure 4:
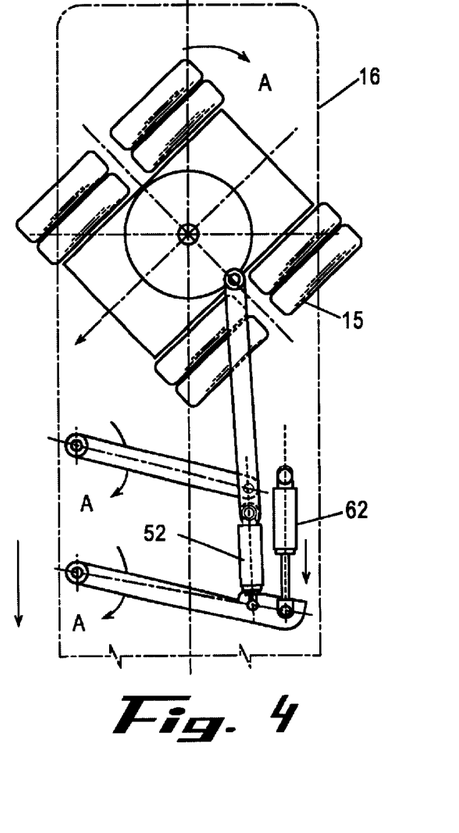
FIG. 4 is the cutaway plan view of FIG. 3, illustrating how a first cylinder extension turns the rear wheel unit about a pivot enabling the truck to turn left.
Figure 5:
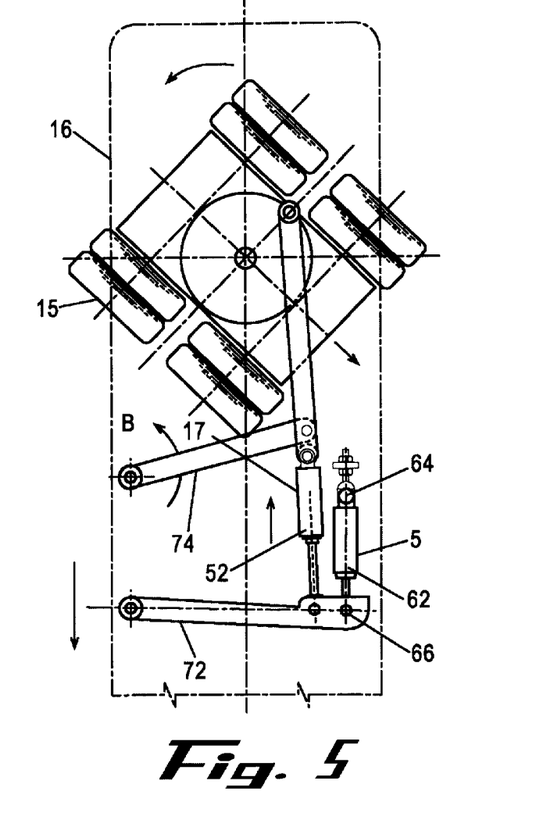
FIG. 5 is the cutaway plan view of FIG. 3, illustrating how a second cylinder extension turns the rear wheel unit about a pivot enabling the truck to turn right.

While steering the rear wheels of a trailer is old art, the preferred method of steering shown in FIGS. 3–5 is novel, and has a number of desirable features. As shown, when the wheels $W_R$ are aligned with the trailer centerline $L_{CENTER}$, both extension members 52, 62 are retracted, as in FIG. 3, and both pivot arms 72, 74 are generally perpendicular to $L_{CENTER}$. When extension member 62 extends, as in FIG. 4, the unit 40 pivots to turn the trailer 12 to the left. Extension of extension member 62 rotates both pivot arms 72, 74 in the direction A, as does so to unit 40.

Similarly, when extension member 52 extends, as in FIG. 5, the unit 40 pivots to turn the trailer 12 to the right. Extension of extension member 52 rotates only pivot arm 74

(not pivot arm 72), in the direction B, as does unit 40, while pivot arm 72 maintains a generally perpendicular relationship to $L_{CENTER}$ because extension member 62 is retracted, thus fixing the distance between fixed end 64 and extension end 66.

Using two separate extension members 52, 62 in this fashion allows the right and the left turns to be performed by separate controls systems—separate electrical and separate hydraulic systems. This enable the extension member 52, 62 to follow "on" and "off" signals of the gyro switch without resorting to a servo system. This preferred means of turning the wheels, however, does not limit the scope of this invention, and any other means of making the wheels follow the gyro position may be used, including the use of king pins and spindles, among others.

Figure 6:
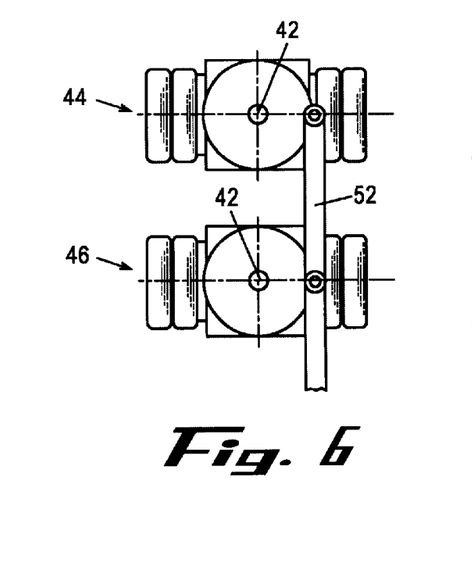
FIG. 6 is a plan view of the tandem wheels being separate, and each axle capable of being pivoted.
Figure 7:
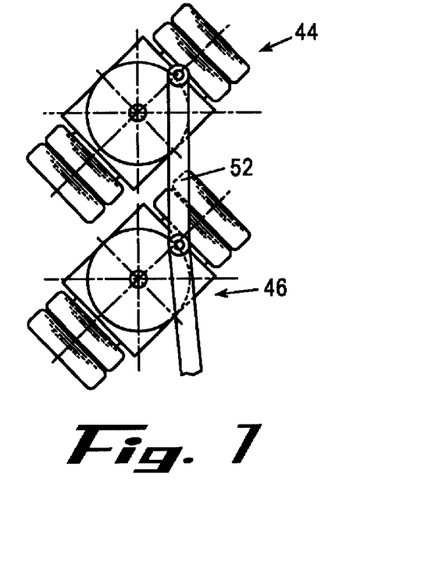
FIG. 7 is the view of FIG. 6, wherein the trailer is turning right.

FIGS. 6 and 7 illustrate unit 40 as two subunits 44, 46, both capable of pivoting about a pivot 42, and further illustrate a modified first extension member 52 pivotally attached to both subunits 44, 46. Subunits 44, 46 have their axles separated so as to turn independently.

The gyrocompass assembly 30 of the present invention further comprises a gyrocompass 80. As shown in FIGS. 8–11, the gyro 80 is held in gimbal 82, which gimbal 82 enable the gyro 80 to pivot vertically. A first biasing element 84 maintains the gyro 80 horizontally when at rest. The first biasing element 84 can be one or more springs. The gimbal 82 is capable of horizontal rotation about vertical axis 86, and a second biasing element 88 keeps the gimbal 82 centered between switches 92, 94. The second biasing element can be one or more springs. The total movement of the gimbal 82 is limited by stops 96 and 98. When the gyro 80 is brought up to speed, it remains in this position, and the tab remains centered between the switches 92, 94.

Figure 8:
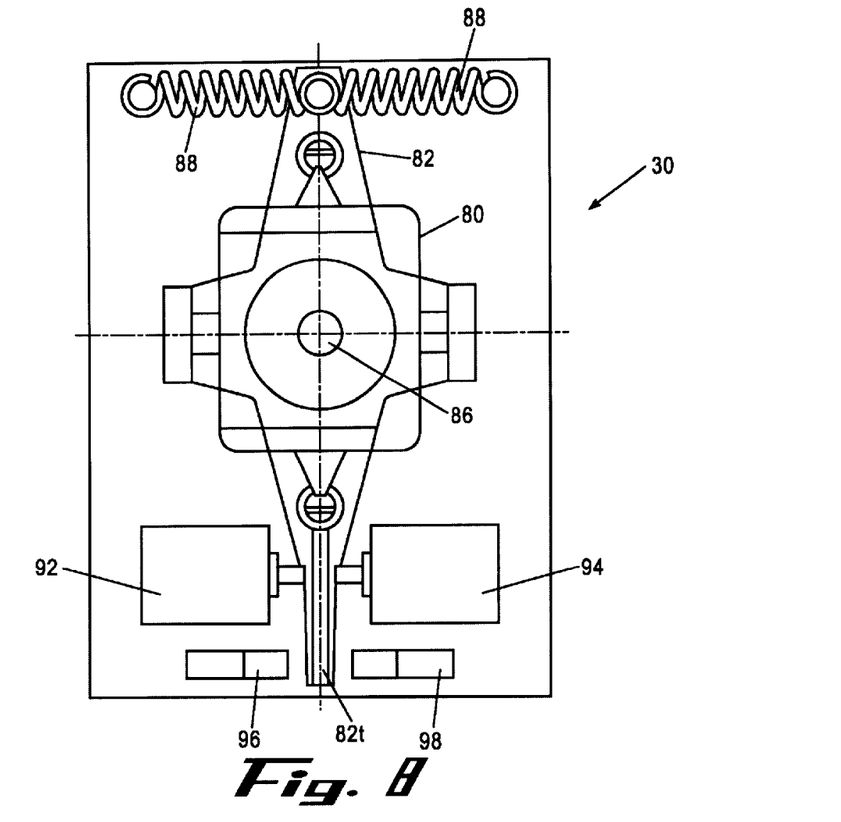
FIG. 8 is a top view of the gyrocompass assembly of the present invention according to a preferred embodiment.
Figure 9:
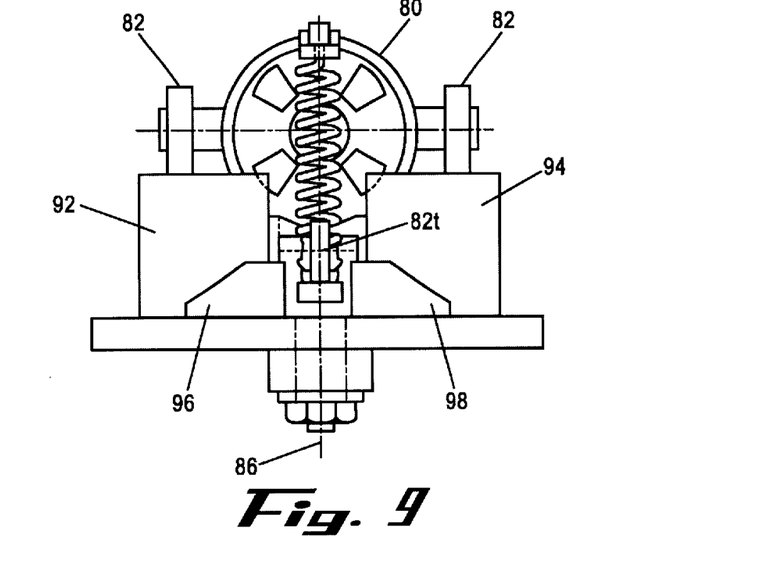
FIG. 9 is a side view of the gyrocompass assembly of FIG. 8.
Figure 10:
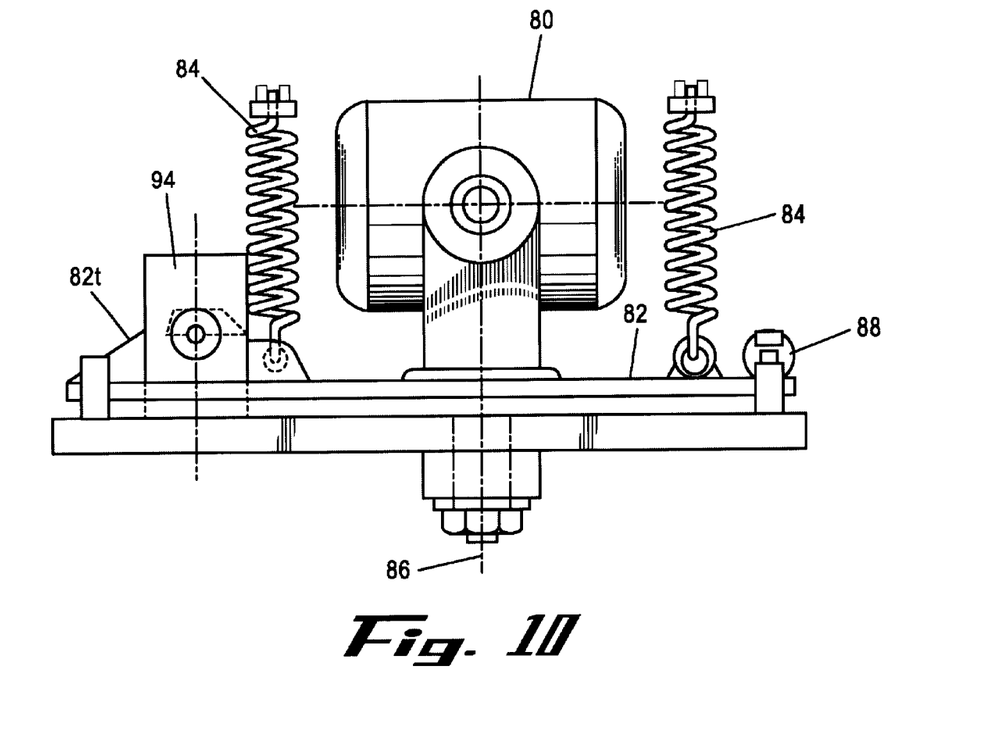
FIG. 10 is a front view of the gyrocompass assembly of FIG. 8.
Figure 11:
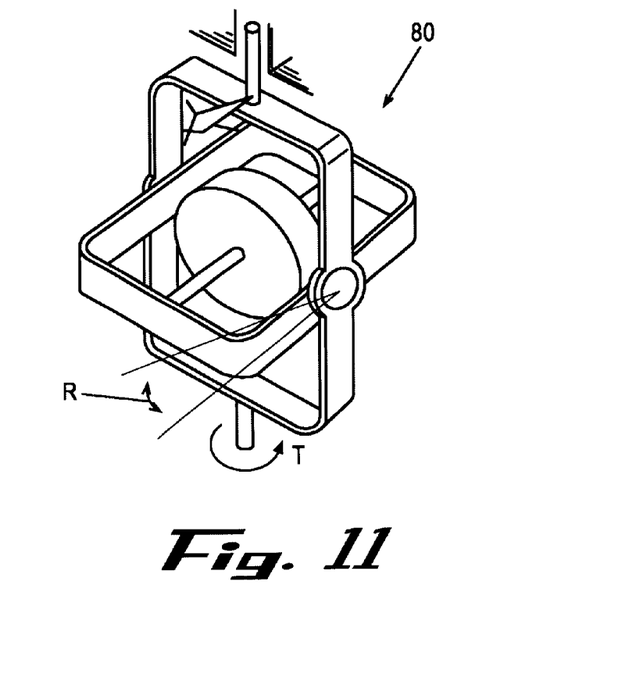
FIG. 11 is an idealized drawing of a two degree of freedom gyroscope.

FIGS. 8–10 are different views of the preferred gyrocompass 80, showing how the gyro motor is held in a horizontal position with springs and is pivoted vertically. The gyro is centered horizontally with springs, and that if the frame turns, it will push against the gyro gimbals and operate a switch. After that, any further movement will be limited by a stop. FIG. 11 illustrates how a torque (T) applied about the vertical axis will be resisted by an opposite torque if the gyro in the horizontal gimbal ring is allowed to precess.

The present rear wheel steering system preferably operates as follows. When the trailer 12 is highway hauling, the wheels WR are locked in exact alignment with the trailer centerline $L_{CENTER}$, and the trailer tracks the semi 14 as is normal. If the trailer must make a sharp turn, whether at a railroad crossing or on a narrow city street, the driver engages the present invention. As the driver approaches the tight turn, he activates the control system 100, shown in FIG. 12, and the gyro 80 is quickly brought up to speed.

When the gyroscope 80 is energized, it will remain as it is in line with the wheel unit 40, and if the wheels $W_R$ are then turned from their original position, the gyroscope 80 resists and a switch 92, 94 is closed. This in turn operates one or both of the extension members 52, 62 to bring the wheels $W_R$ back to their original position.

Elaborate servo systems can be used to turn the wheels $W_R$, but, since most turns take less than a minute, some friction and small deviations due to the biasing elements 84, 88 will typically go unnoticed. So, in the preferred gyro control as is shown in FIGS. 8–11, the gyro 80 may just be a standard electric motor. An electric motor will resist a turning moment if it is mounted in gimbal rings and allowed to precess.

If the unit 40 begins to turn, the gyro 80 precesses (tilts about its horizontal axis) and the gimbal 82 remains unmoved, and one of the switches 92, 94 moves against the gimbal tab 82t. This operates one or both of the extension members 52, 62 to rotate the unit 40 back to its original position. This operation is repeated over and over to keep the wheels moving straight down the street as the trailer turns the corner.

Figure 12:
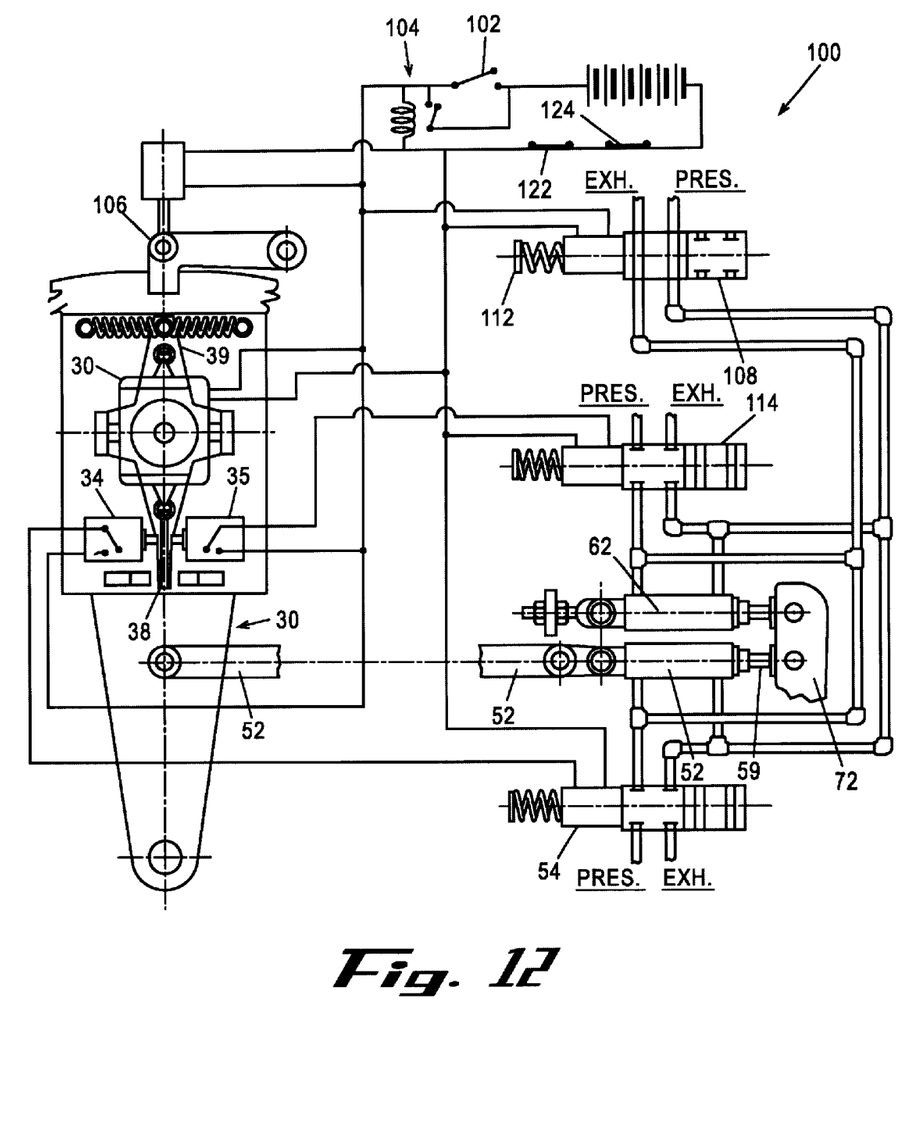
FIG. 12 is a schematic diagram showing the preferred embodiment of the control system of the present invention, including electrical and hydraulic systems.

As shown schematically in FIG. 12, as the driver approaches an intersection, he closes a start button 102, located, for example, on the dash of the semi. A holding coil and switch 104 lock in the circuit. This energizes the gyrocompass 80, and it matches the direction of the trailer movement, which, thereafter, is the zero direction of the gyrocompass 80. This also puts the gyrocompass 80 in control of the extension members 52, 62, and opens a tandem lock 106 to allow the tandem wheels $W_R$ to turn relative to the trailer.

Before the system is energized, a valve 108 is held in the open position by, for example, a spring 112. This maintains both extension members 52, 62 retracted. After energizing, the valve 108 blocks the lines, and this places the extension members 52, 62 under the control of valves 114 and 115.

As the semi enters the intersection, the trailer turns the wheels slightly, and the gyro closes one of the switches, say switch 92. Momentarily, the valve 108 is energized, putting pressure on extension member 52. The member 52 is extended a small amount, forcing the wheel unit 40 and the gyrocompass assembly 30 to turn. The tab 82t on the gyro gimbal 82 returns to center, opening the switch 92, and blocking the member 52 at the furthermost extended position. As the semi turns further down the street, this operation is repeated over and over until the wheels $W_R$ have turned against a switch 122 or 124 at a stop, and this breaks the circuit. The tandem wheels pivot back to align with the trailer. With long trailers, the wheels may be left against the stop the remainder of the way around the corner, and the circuit broken by the driver.

Figure 13:
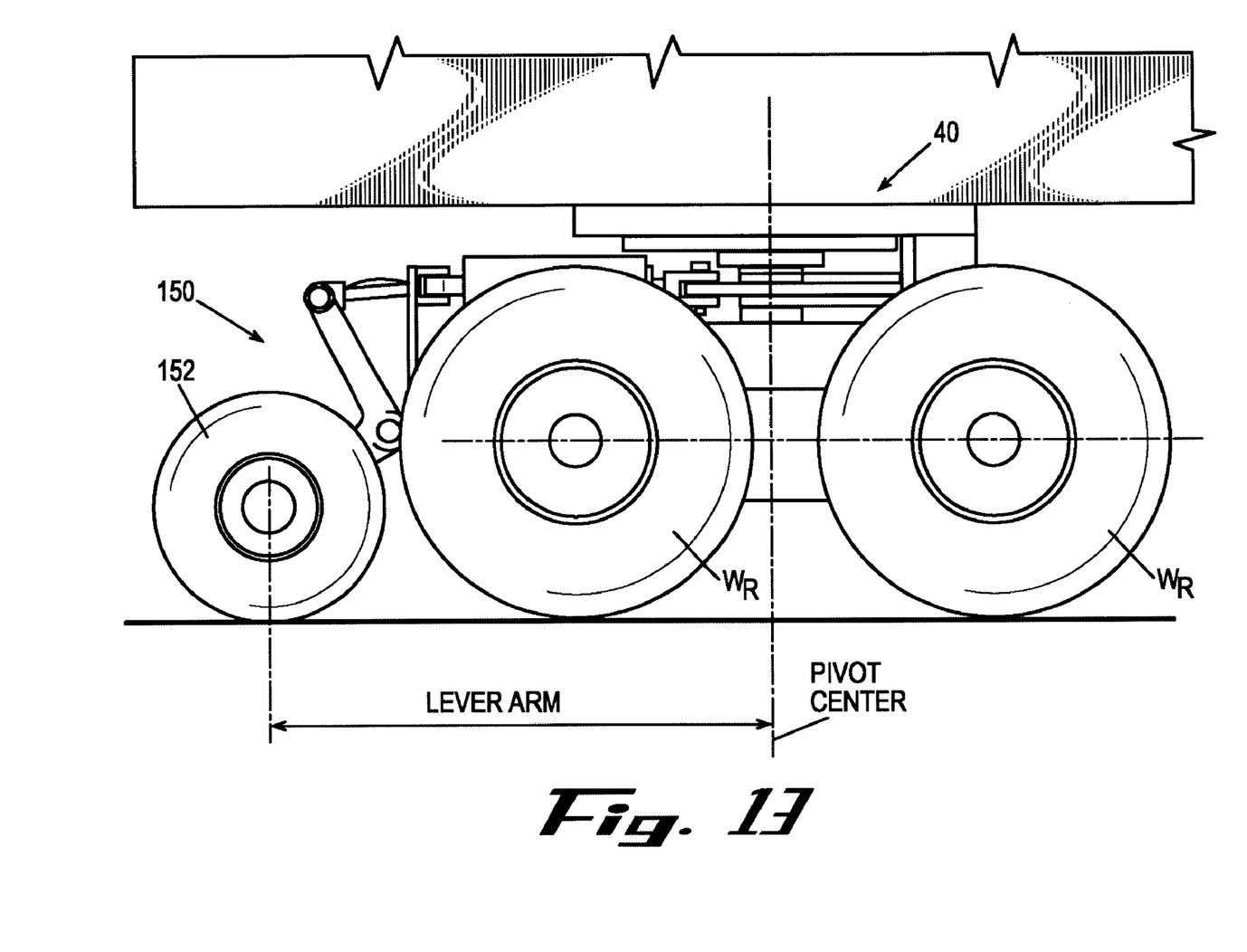
FIG. 13 is a side elevation view of the wheel unit with the guide wheel let down to guide the wheels straight down the street.

Another embodiment of the control system 100 and a rear wheel guidance system 150 includes a guide control wheel 152 as shown in FIG. 13. FIG. 13 illustrates a guide control wheel 152 adjacent the pivotal rear wheel unit 40. If the driver wishes to make a turn into a side street, he operates the control system 100 shown in FIG. 14, which shows the control in the highway driving position.

Figure 14:
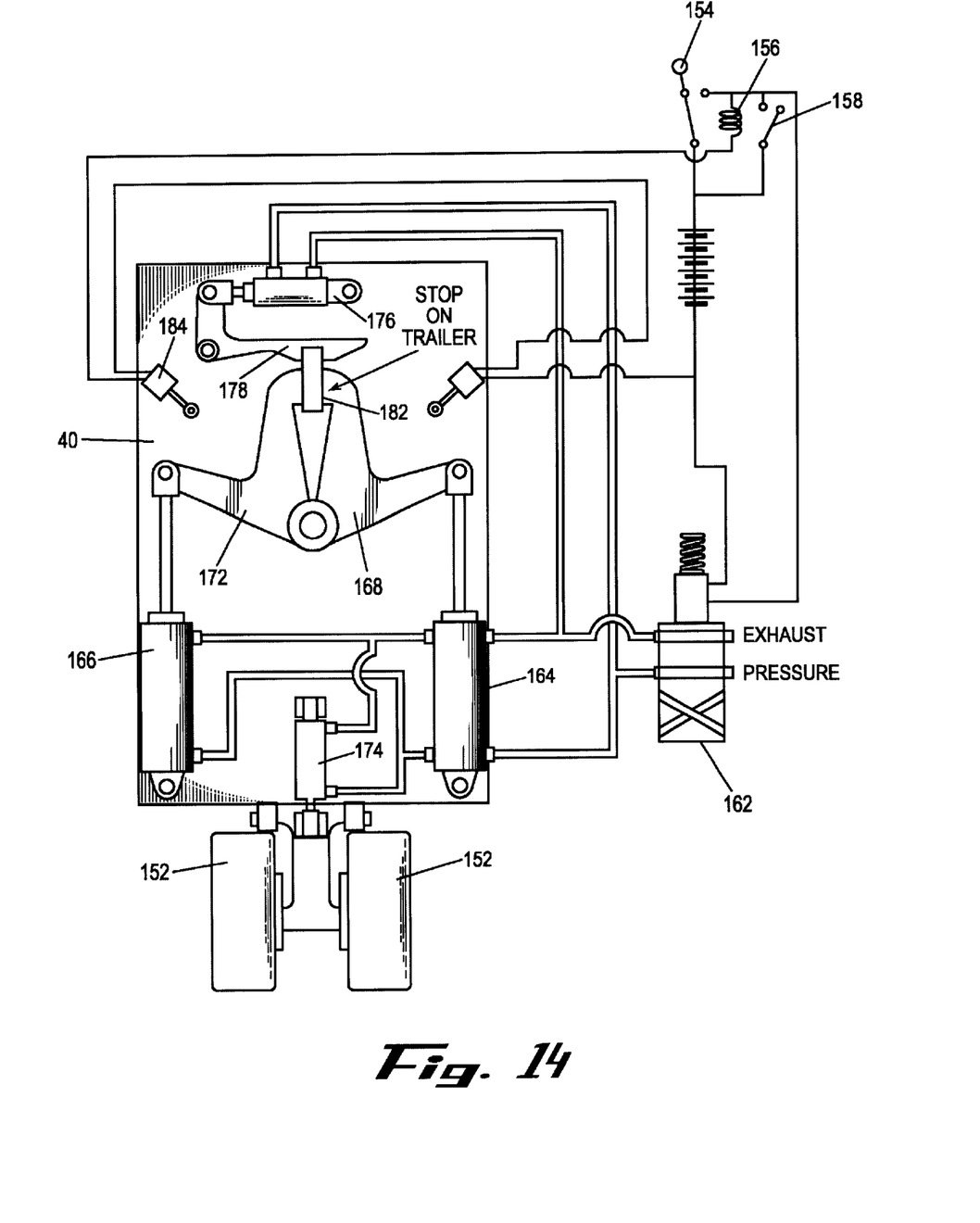
FIG. 14 is a schematic diagram showing a control system that may be used, wherein the rear wheel unit is locked securely to the trailer for highway hauling, whereby the process of this patent might be carried out, showing the use of electrical switches, valves and hydraulic cylinders.

To make the turn, the driver closes a turn switch 154, energizing a holding coil 156, closing another switch 158, and holds it closed when switch 154 is released. This energizes a valve 162 which shifts to retract cylinders 164, 166, which in turn open restraining arms 168 and 172, extending cylinder 174 which lowers the guide wheel 152. When the valve 162 is shifted, it extends cylinder 176, which opens lock 178,which frees the stop 182 on the trailer 12, allowing the trailer to pivot about the wheel unit 40. At this time, the guide wheel 152 are lowered to contact the road, and keep the wheel unit 40 moving straight down the road.

As the semi starts to turn into the side street, the front of the trailer 12 turns with the semi, and the rear end of the trailer pivots on the rear wheel unit 40, which rolls straight down the street.

Figure 15:
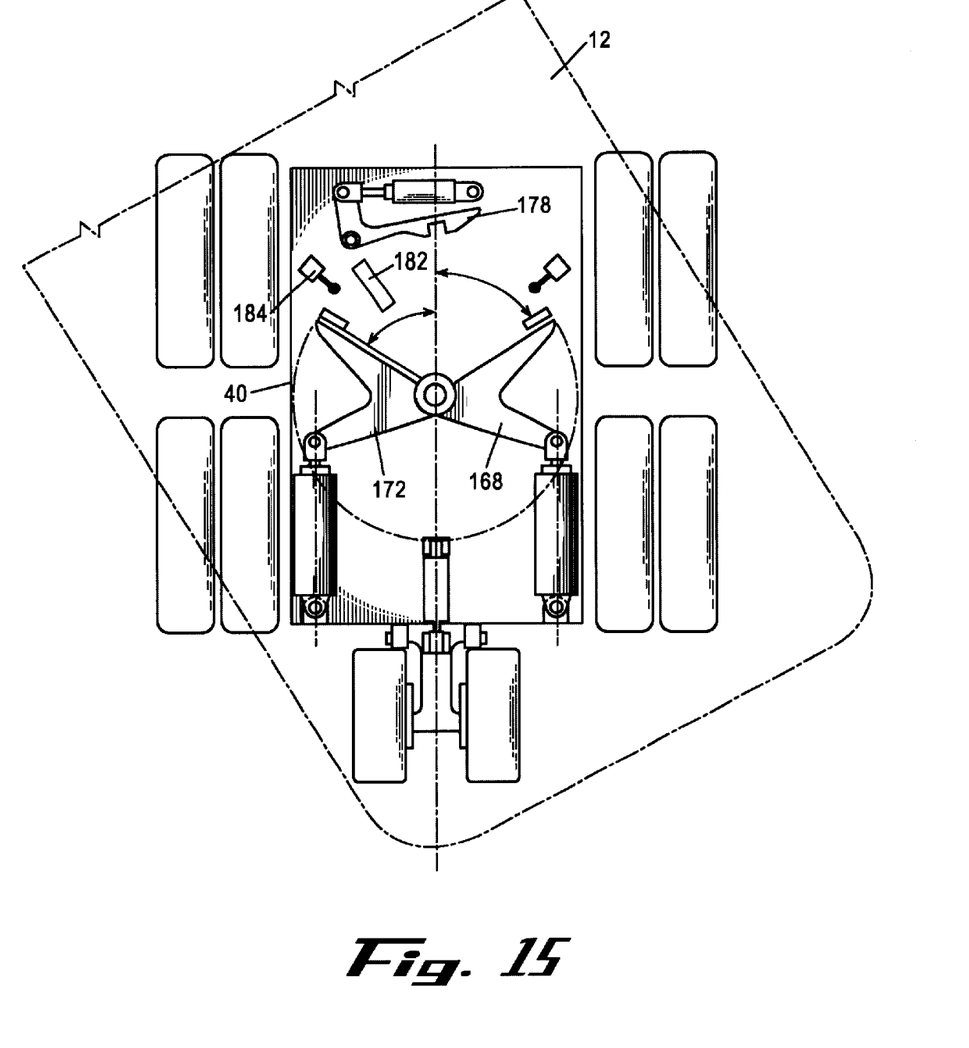
FIG. 15 is a plan view of the pivoted tandem rear wheels of a trailer, wherein the wheel unit is released and the trailer is turning to the left.

FIG. 15 shows trailer 12 pivoting to the left about the rear wheel unit 40 with the open lock 178 and the restraining arms 168 and 172 fully open. The trailer stop 182 is approaching a limit switch 184.

The trailer 12 will continue to pivot about the rear wheels until the stop 182 operates the limit switch 184, which will reverse the cylinders and realign the wheel unit 40 with the trailer.

For realignment, FIG. 14 shows that when the stop 182 comes against the switch 184, it opens the holding circuit to the coil 156, which releases the switch 158, breaking the circuit to the valve 162. Valve 162 shifts back, reversing the cylinders 164, 166, 174 and 176. This turns the arms 168, 172 back to the closed position, forcing the stop 182 back to the center with the wheel unit 40 aligned with the trailer. It also lifts the guide wheel 152, and closes the lock 178.

The angle the trailer turns before the switch 184 is activated may be adjusted by the driver.

Although the present invention has been described with respect to particular embodiments, it will be apparent to those skilled in the art that modifications to the method of the present invention can be made which are within the scope and spirit of the present invention and its equivalents.

What is claimed is:

1. A process of rear wheel steering for a vehicle traveling on a driving surface, the vehicle having a front wheel and a pivotal rear wheel, the vehicle having a normal driving state wherein the centerlines of the front and back wheels are generally parallel, the vehicle having a turning state when the vehicle turns from the normal driving state, the process for rear wheel steering comprising the steps of:
   (a) resisting the rear wheel from pivoting during the normal driving state so the centerline of the rear wheel remains generally parallel to the centerline of the front wheel;
   (b) guiding the pivoting of the rear wheel upon entrance of the turning state; and
   (c) freeing the rear wheel from guidance prior to exit of the turning state;
   wherein the step of guiding the pivoting of the rear wheel includes the substep of lowering a guide control wheel to the driving surface, the guide control wheel assisting the rear wheel to resist pivoting upon entrance of the turning state.

2. The process of rear wheel steering according to claim 1, the step of freeing the rear wheel from guidance comprising the substep of raising the guide control wheel from the driving surface.

3. The process of rear wheel steering according to claim 1, furthering comprising the step of providing a control system to determine when to initiate the step of guiding the pivoting of the rear wheel.

4. The process of rear wheel steering according to claim 3, wherein the control system further determines when to initiate the step of freeing the rear wheel from guidance.

5. The process of rear wheel steering according to claim 1, further comprising the step of guiding the rear wheel back into alignment with the centerline of the front wheel upon freeing the rear wheel from guidance with the guide control wheel.

6. A process of rear wheel steering for a vehicle in a turn, the vehicle having a pivotal rear wheel in contact with a driving surface, the vehicle having a lengthwise centerline, the process of steering comprising the following steps:
   (a) lowering a guide control wheel to the driving surface, the guide control wheel assisting the rear wheel to resist pivoting upon entrance of the turn;
   (b) detecting the orientation of the centerline of the rear wheel relative to the orientation of centerline of the vehicle through the vehicle turn; and
   (c) raising the guide control wheel from the driving surface in response to the difference in the orientations of the centerline of the rear wheel and the vehicle centerline when a preset difference in the orientations is reached.

7. The process of rear wheel steering according to claim 6, further comprising the step of guiding the rear wheel back into alignment with the centerline of the front wheel upon freeing the rear wheel from guidance with the guide control wheel.

8. A rear wheel steering device for a vehicle traveling on a driving surface, the vehicle having a front wheel and a pivotal rear wheel, the vehicle having a normal driving state wherein the centerlines of the front and back wheels are generally parallel, the vehicle having a turning state when the vehicle turns from the normal driving state, the device for rear wheel steering comprising:
   (a) resisting means to resist the rear wheel from pivoting during the normal driving state so the centerline of the rear wheel remains generally parallel to the centerline of the front wheel;
   (b) guiding means to guide the pivoting of the rear wheel upon entrance of the turning state; and
   (c) freeing means to free the rear wheel from guidance prior to exit of the turning state;
   wherein the guiding means for guiding the pivoting of the rear wheel includes a guide control wheel that is lowered to the driving surface, the guide control wheel assisting the rear wheel to resist pivoting upon entrance of the turning state.

9. The rear wheel steering device of claim 8, wherein the freeing means includes the raising of the guide control wheel from the driving surface.

10. The device of claim 8, furthering comprising determining means to determine when to initiate the step of guiding the pivoting of the rear wheel.

11. The device of claim 10, wherein the determining means further determines when to initiate the step of freeing the rear wheel from guidance.

12. The device of claim 8, further comprising guiding means to guide the rear wheel back into alignment with the centerline of the front wheel upon freeing the rear wheel from guidance with the guide control wheel.

* * * * *